(12) United States Patent
Delage et al.

(10) Patent No.: US 10,573,422 B2
(45) Date of Patent: Feb. 25, 2020

(54) BASKET FOR TRANSPORT AND/OR STORAGE OF RADIOACTIVE MATERIALS

(71) Applicant: TN International, Montigny le Bretonneux (FR)

(72) Inventors: Olivier Delage, Les Clayes-sous-Bois (FR); Christophe Roger, Noisy-le-Grand (FR)

(73) Assignee: TN INTERNATIONAL, Montigny le Bretonneux (FR)

( * ) Notice: Subject to any disclaimer, the term of this patent is extended or adjusted under 35 U.S.C. 154(b) by 439 days.

(21) Appl. No.: 15/502,916

(22) PCT Filed: Aug. 10, 2015

(86) PCT No.: PCT/EP2015/068331
§ 371 (c)(1),
(2) Date: Feb. 9, 2017

(87) PCT Pub. No.: WO2016/023849
PCT Pub. Date: Feb. 18, 2016

(65) Prior Publication Data
US 2017/0229199 A1  Aug. 10, 2017

(30) Foreign Application Priority Data
Aug. 13, 2014 (FR) ...................................... 14 57789

(51) Int. Cl.
*G21F 5/12* (2006.01)
*G21F 5/012* (2006.01)
*G21C 19/07* (2006.01)

(52) U.S. Cl.
CPC ............. *G21F 5/012* (2013.01); *G21C 19/07* (2013.01); *G21F 5/12* (2013.01)

(58) Field of Classification Search
CPC ........... G21F 5/012; G21F 5/12; G21C 19/07; B65D 7/30; B65D 7/24; B65D 7/32; B65D 7/12
(Continued)

(56) References Cited

U.S. PATENT DOCUMENTS 5,881,120 A    3/1999  Chanzy
2013/0092684 A1  4/2013  Roger

FOREIGN PATENT DOCUMENTS

EP    2 112 665 A1   10/2009
FR    2 747 825 A1   10/1997
(Continued)

OTHER PUBLICATIONS

Search Report issued in French Patent Application No. 14 57789 dated Apr. 9, 2015.
(Continued)

*Primary Examiner* — Stephen J Castellano
(74) *Attorney, Agent, or Firm* — Pearne & Gordon LLP (57) ABSTRACT

A basket (1) for transport and/or storage packaging of radioactive materials. The basket (1) comprises an internal partition (6, 8) having at least one wall (82, 84), and a peripheral partition (10). The wall (82, 84) has two opposing lateral surfaces (81, 85). The peripheral partition (10) interacts with the internal partition (6, 8) to define cells for housing the radioactive materials. The peripheral partition (10) comprises a housing accommodating one end of the at least one wall (82, 84). The housing comprises two opposing lateral housing surfaces (102, 106) and a bottom (104) bringing together the two lateral surfaces (102, 106) of the housing. According to the invention, the basket (1) comprises a tightening element configured to press at least one of the lateral surfaces (81, 85) of the wall against at least one of the lateral surfaces (102, 106) of the housing.

20 Claims, 5 Drawing Sheets (58) Field of Classification Search
USPC .... 220/4.28, 4.33, 507, 528, 4.17, 529, 4.16
See application file for complete search history.

(56) References Cited

FOREIGN PATENT DOCUMENTS

FR          2 961 942 A1      12/2011
JP          2004-163120 A      6/2004

OTHER PUBLICATIONS

International Search Report issued in Application No. PCT/EP2015/068331 dated Sep. 30, 2015.
Written Opinion issued in Application No. PCT/EP2015/068331 dated Sep. 30, 2015.

BASKET FOR TRANSPORT AND/OR STORAGE OF RADIOACTIVE MATERIALS

This application is the national stage (Rule 371) of international application PCT/EP2015/068331 filed Aug. 10, 2015.

TECHNICAL FIELD

The invention relates to a storage device for storing and/or transporting radioactive materials. More particularly, the invention relates to a storage device for transporting and/or storing, preferably irradiated, nuclear fuel assemblies.

STATE OF PRIOR ART

Such storage devices, also called storage «baskets» or «racks», have a plurality of cells inside which irradiated nuclear fuel assemblies are placed, for the transport and/or storage thereof. Fuel assemblies are in particular caused to be moved from the nuclear power plant, once they are no longer used as an energy source, to their storage or treatment site.

This basket type is subjected to high temperatures. But, since mechanical characteristics of the structural elements making of the basket are degraded with temperature, it is necessary to remove the heat flux produced by the irradiated assemblies contained in the basket outwardly, in order to limit the temperature rise in the basket and thus ensure that the mechanical strength thereof is compatible with so-called free drop on undeformable target tests.

In such baskets, peripheral partitions are attached to internal partitions by tightening screws extending mainly along the longitudinal direction of the internal partitions. The internal partitions are then in thermal contact with peripheral partitions substantially on the edge of the internal partitions.

It is useful to increase the thermal contact area between the internal partitions and the peripheral partitions, in order to improve heat removal off the basket.

DISCLOSURE OF THE INVENTION

The invention aims at solving at least partially the problems met in solutions of prior art.

In this regard, one object of the invention is to provide a basket for transport and/or storage packaging of radioactive materials such as nuclear fuel assemblies. The basket comprises at least one internal partition and at least one peripheral partition. The peripheral partition is located sideways at the periphery of the internal partition. The internal partition comprises at least one wall having two opposite lateral surfaces.

The internal partition delimits at least partially on either side of the same two cells intended to house radioactive materials, the peripheral partition participating with the internal partition in delimiting the cells.

The peripheral partition comprises at least one housing accommodating one end of the at least one wall, the housing comprising two opposite lateral housing surfaces and a bottom bringing together both lateral housing surfaces.

According to the invention, the basket comprises a tightening means configured to press at least one of the lateral wall surfaces against at least one of the lateral housing surfaces.

The lateral contact of the at least one internal partition wall with at least one of the lateral surfaces of its housing provides an increase in the thermal contact area between the internal partition and the peripheral partition to which the internal partition is attached.

As a result, there is a better heat removal off the basket and thus a decrease in the temperatures within the structural elements making it up. The mechanical strength of the basket is thus promoted by this improved heat removal.

When the wall edge is also in thermal and mechanical contact with the housing bottom, heat removal off the basket is further increased.

The invention can optionally include one or more of the following characteristics combined to each other or not.

Depending on the type of radioactive material, the internal partition can comprise two parallel walls separated by a spacing, each of the walls having a lateral external surface and a lateral internal surface, at least one of the lateral internal/external surfaces being configured to be pressed against one of the lateral housing surfaces by the tightening means.

When the internal partition end comprises two walls accommodated in two distinct separated housings, it is preferable that each of the lateral wall surfaces is in thermal and mechanical contact with one of the opposite lateral housing surfaces.

Advantageously, the tightening means generates a pinching strain of the internal partition wall end between said lateral housing surface against which the wall is pressed, called a first pinching surface, and a second pinching surface facing the first pinching surface.

The heat exchanges between the internal partition and the peripheral partition are increased when the internal partition is pinched.

According to a particular embodiment, the end of the at least one wall is pinched in the housing, by being in mechanical contact with both lateral housing surfaces.

According to an advantageous embodiment, the peripheral partition comprises an internal surface oriented inwardly of the basket and participating in delimiting the cells, the housing opening to the internal surface, such that at least one of the lateral housing surfaces is orthogonal to the internal surface.

Preferably, a value ratio of a thickness of at least one wall to a length of wall lateral surface contact surface with one of the lateral housing surfaces, in a transverse cross-sectional plane of the basket, is between 0.2 and 1. A ratio equal to 1 remains advantageous when both lateral wall surfaces are in contact with the lateral housing surfaces.

According to another advantageous embodiment, the internal partition is in mechanical contact with the peripheral partition on at least ¾ the height of the peripheral partition, preferably over substantially the entire height of the basket.

According to another particular embodiment, the basket comprises a plurality of internal partitions formed by stacked interlaced structural elements.

The tightening means preferably comprises a plurality of tightening elements spaced to each other along the height of the basket. The tightening elements are preferably configured each to exert a tightening force the value of which is independent of that of the other tightening elements.

The plurality of tightening elements spaced along the height facilitates in particular a mechanical and thermal contact of the peripheral partition with an internal partition made as a single piece which extends substantially on the entire height of the basket.

On the other hand, a plurality of tightening elements spaced from each other along the height of the basket is also interesting, when the internal partitions are formed by stacked interlaced structural elements. Indeed, the tightening elements thereby make it possible to compensate all the more easily for the possible differential expansions and possible manufacturing and assembly tolerances of the stacked interlaced structural elements.

Advantageously, the tightening means is configured to be tightened/untightened from outside the basket. Basket assembly/disassembly operations are in particular facilitated.

According to one particular embodiment, the tightening means comprises a screw and a nut configured to cooperate with the screw. Thereby, the tightening means is of a simple structure and can also be used to attach the internal partition to the peripheral partition.

According to an advantageous embodiment, the tightening means comprises at least one jaw, the jaw being separation biased by the nut for pressing at least one of the lateral wall surfaces against at least one of the lateral housing surfaces.

The tightening means preferably comprises at least one first tilted surface, the peripheral partition or the wall end comprising at least one second tilted surface complementary to the first tilted surface and configured to be supported on the first tilted surface. The increase in the tightening area facilitates lateral pressing of the wall in its housing.

According to an advantageous embodiment, the tightening means comprises at least one elastic tightening element located in the spacing defined above, the elastic tightening element tending to press at least one of the lateral external surfaces against one of the lateral housing surfaces.

The invention also relates to a pack for transporting and/or storing radioactive materials such as nuclear fuel assemblies, the pack comprising a packaging and a lid closing the packaging, the packaging housing a basket as defined above.

The invention also relates to a method for assembling a basket as defined above, comprising, after a prior step of accommodating the wall end in its housing, a step of pressing at least one of the lateral wall surfaces against one of the lateral housing surfaces, such that the wall is located between the tightening means and the lateral housing surface against which the lateral wall surface is pressed.

BRIEF DESCRIPTION OF THE DRAWINGS

The present invention will be better understood upon reading the description of exemplary embodiments, given by purely indicating and in no way limiting purposes, making reference to the appended drawings in which.

DETAILED DISCLOSURE OF PARTICULAR EMBODIMENTS

Identical, similar or equivalent parts of the different figures bear the same reference numerals so as to facilitate switching from one figure to the other.

Figure 1:
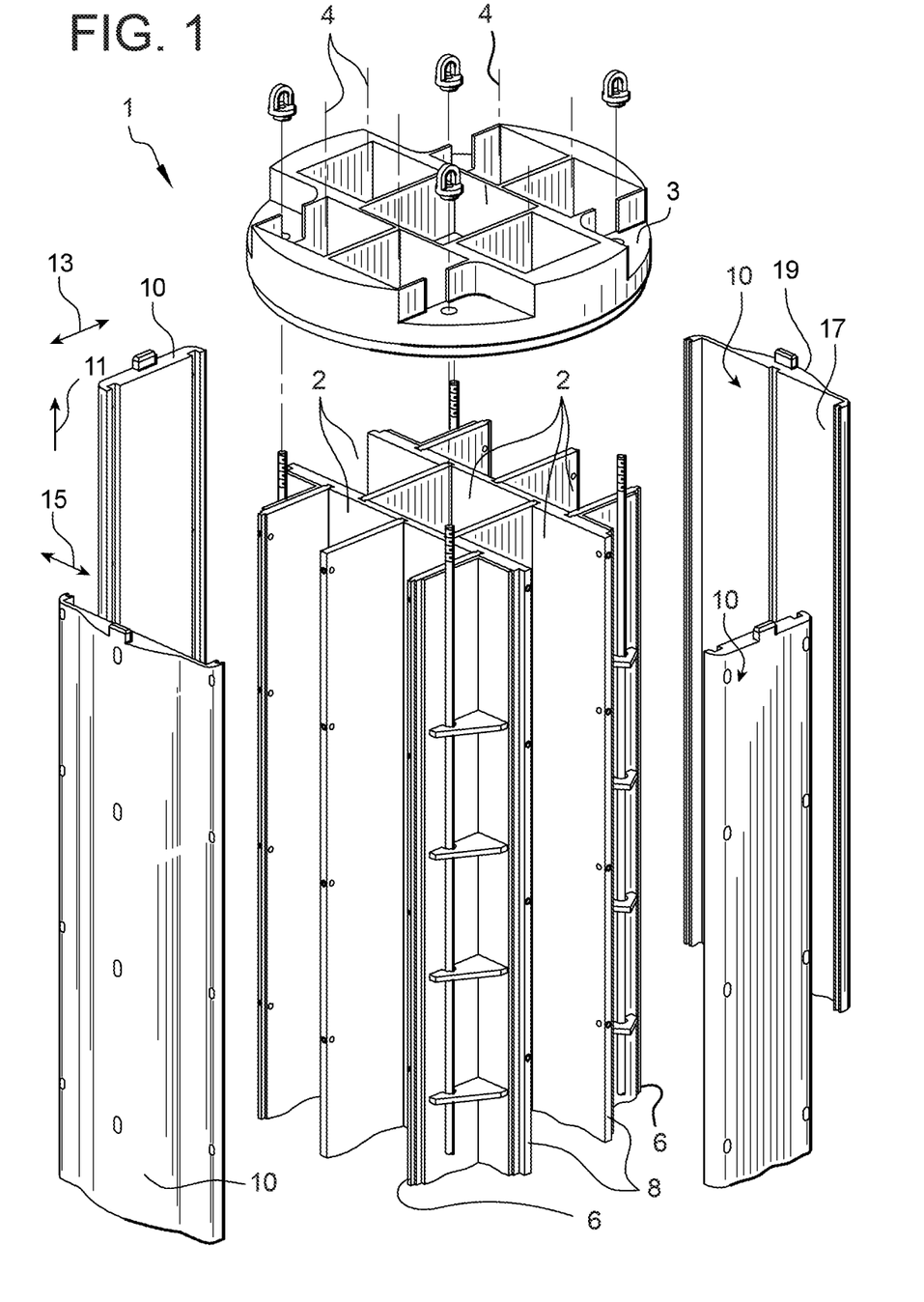
FIG. 1 is an exploded partial schematic representation of a basket for transporting/storing radioactive materials, according to a first preferred embodiment of the invention (tightening means not represented)

FIG. 1 represents a storage device 1 for irradiated nuclear fuel assemblies in a packaging (not represented) for transporting and/or storing fuel assemblies. The storage device 1 is called a basket in the following of the description. The basket 1 includes a head plate 3 and a bottom (not represented).

Figure 2:
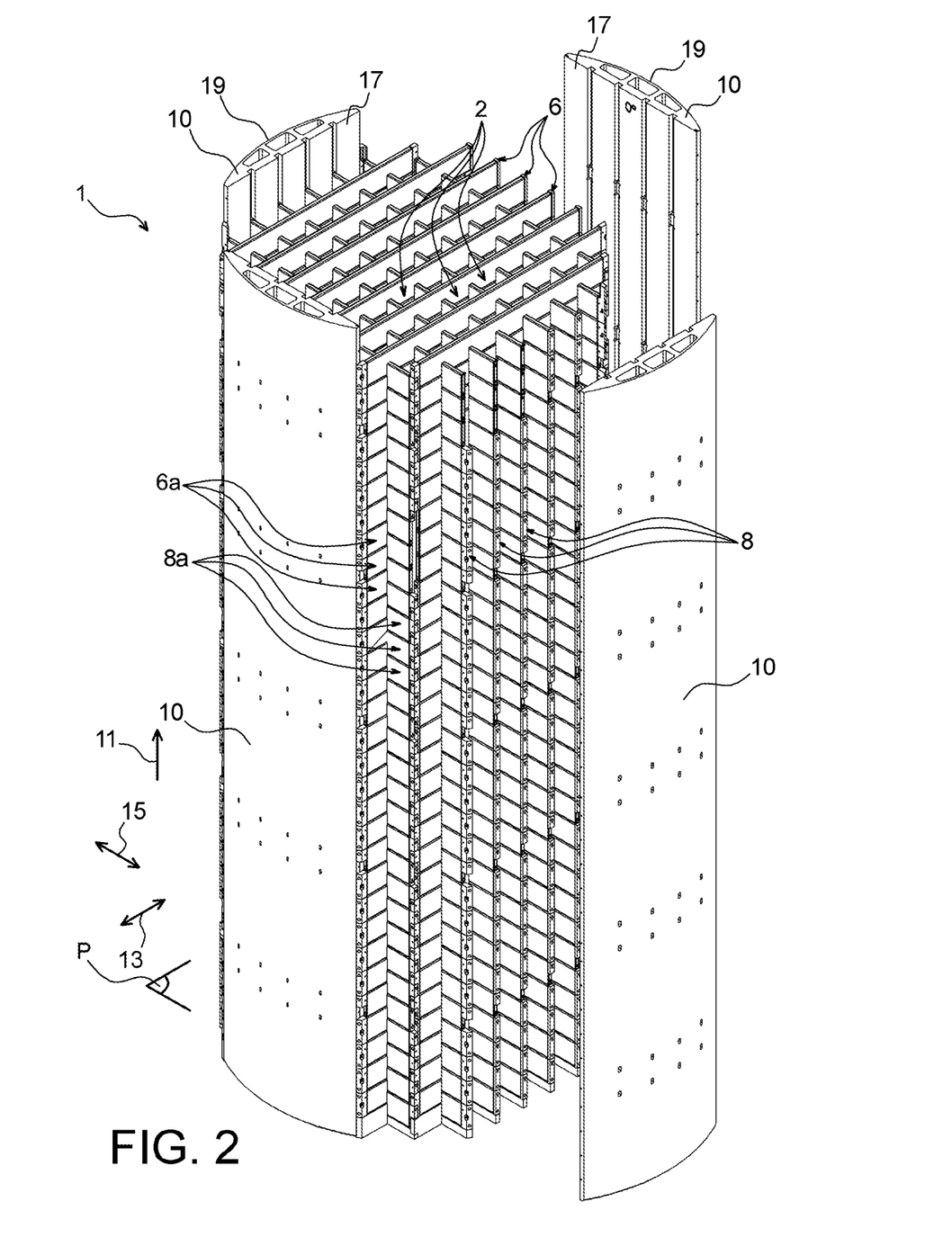
FIG. 2 is an exploded partial schematic representation of a basket for transporting/storing radioactive materials, according to a second preferred embodiment of the invention (tightening means not represented)

In reference to FIGS. 1 and 2, the basket 1 comprises a plurality of adjacent cells 2, each of the latter extending along a longitudinal axis 4 of the basket. The cells 2 are of a square cross-section. They are each able to accommodate a square cross-section fuel assembly. However, the fuel assemblies and/or the cells 2 can also assume other shapes, such as a hexagonal shape.

The cells 2 are provided so as to be juxtaposed to each other. They are made through a plurality of partitions 6, 8 and 10. The partitions 6, 8 and 10 are distributed into three distinct partition sets, respectively defined by a first set of internal partitions 6, a second set of internal partitions 8, as well as a set of peripheral partitions 10 radially located at the periphery of the internal partitions 6 and 8 with respect to the longitudinal axis 4 of the basket.

The partitions 6, 8, 10 are common to several cells 2. In this regard, it is noted that the internal partitions 6, 8 generally participate in delimiting several cells 2 located on either side of the internal partition 6, 8 in question. The partitions 6, 8 comprise one or more walls 80, 82, 84 intended to separate the cells 2. These walls 80, 82, 84 have basically the shape of a plate.

The internal walls 6, 8 are assembled to each other so as to be disposed in parallel and perpendicular to each other, in order to form square cross-section cells 2. The first internal partitions 6 are disposed in parallel to each other, in the same way as the second internal partitions 8 between them. Moreover, the first internal partitions 6 are assembled so as to be substantially perpendicular to the second internal walls 8. The peripheral partitions 10 are attached to the internal partitions 6, 8, so as to close the cells 2 at the periphery of the basket 1.

In other words, the internal partitions 6, 8 make up at least three of the four planar lateral faces delimiting a cell 2. The internal surfaces 17 of the peripheral partitions 10 each form possibly one of the four planar lateral faces delimiting a cell 2.

These internal surfaces 17 are oriented inwardly of the basket 1, as opposed to the external surfaces 19 of the peripheral partitions 10 which are located at the periphery of the basket 1 and which delimit the outside of the basket 1. The external surfaces 19 are preferably arcs of circles, so as to facilitate inserting/removing the basket 1 into/from the circular cavity of a packaging (not represented).

In reference more specifically to the first embodiment, the internal partitions 6 and 8 are made as a single piece, each so as to extend on the entire length of the cell(s) 2 they define. In a similar way, the peripheral partitions 10 are made as a single piece, each so as to extend on the entire length of the cells 2 they define.

In reference specifically to FIG. 2, the cells 2 are made through a plurality of structural assemblies 6a, 8a with notches and stacked along a stacking direction 11 parallel to the longitudinal axis 4 of the basket. The stacking direction 11 extends from the bottom of the storage device to a basket head plate. The stacking direction 11 is also called the basket height.

The stack of parallel structural assemblies 6a, along a first direction 13, forms a first internal partition 6. The stack of parallel structural assemblies 8a, along a second direction 15, forms a second internal partition 8.

The directions 11, 13 and 15 are orthogonal two by two. The notch structural assemblies 6a, 8a are thus perpendicularly interlaced.

Figure 3:
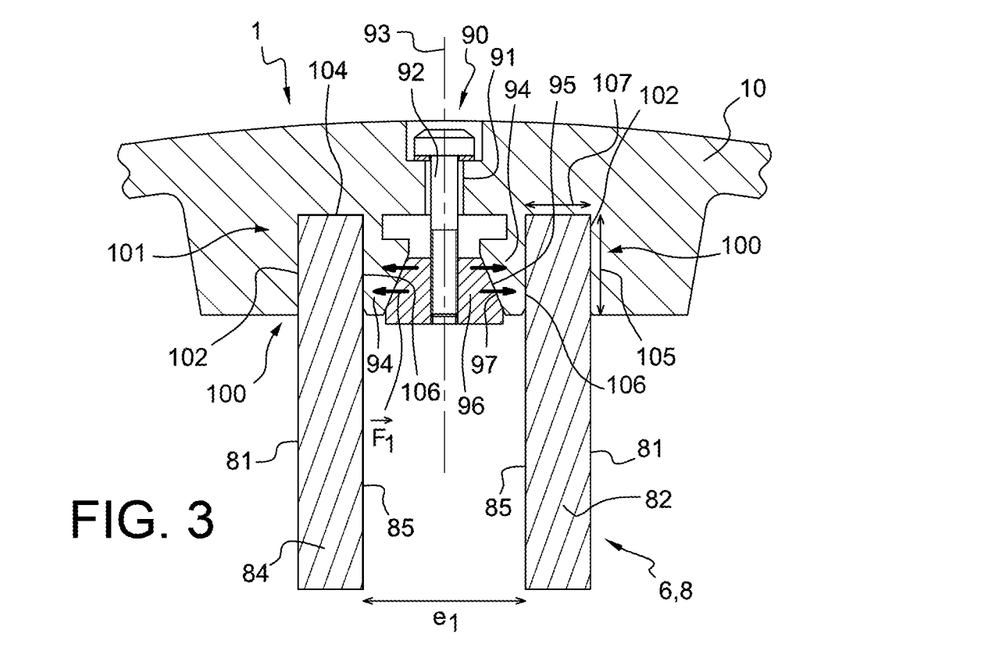
FIG. 3 is a schematic partial transverse cross-section view of the basket according to the first or the second embodiment, showing tightening of an internal partition in a peripheral partition housing.
Figure 4:
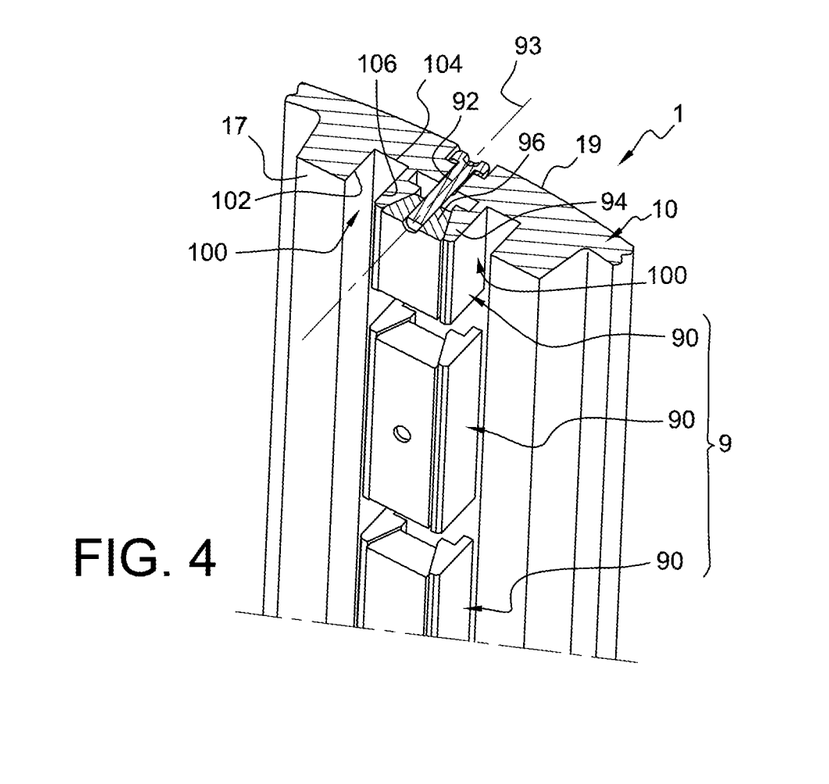
FIG. 4 is a perspective partial schematic representation of the peripheral partition of FIG. 3.

The structural assemblies 6a, 8a extend between at least two opposite peripheral partitions 10 to which they are attached. In the second embodiment, the peripheral partitions 10 are made as a single piece. Alternatively, it is quite contemplatable to provide that each peripheral partition 10 is made through a plurality of stacked structural assemblies. FIGS. 3 and 4 represent tightening of one of the internal partitions 6, 8 in a housing of a peripheral partition 10 of a basket 1, according to the first or the second embodiment.

The internal partition 6, 8 comprises two parallel walls 82, 84 separated by a spacing. The walls 82, 84 are preferably identical. Each of the walls 82, 84 has a lateral external surface 81 and a lateral internal surface 85, such that the lateral external surface 81 and the lateral internal surface 85 are on either side of the wall 82, 84. The spacing $e_1$ is held constant, for example by means of spacers (not represented) supported on the lateral internal surfaces 85, inside the spacing $e_1$.

The end of the internal partition 6, 8 is housed in a recess 101 which is made in the peripheral partition 10 and which comprises two housings 100 to house the partitions 82, 84.

The end of each of the parallel walls 82, 84 of the internal partition 6, 8 is accommodated in one of the housings 100 of the peripheral partition 10. These housings 100 each comprise two opposite parallel lateral surfaces 102, 106. The lateral housing surfaces 102, 106 are gathered by a bottom 104. The housings 100 lead to an internal surface 17 of the peripheral partition 10, such that the lateral housing surfaces 102, 106 are orthogonal to the internal surface 17. The internal surface 17 and the internal partition 6, 8 delimit two contiguous cells 2, on either side of the internal partition 6, 8.

The lateral external surface 81 of each of the walls 82, 84 is pressed against one of the lateral housing surfaces 102, 106 by a tightening means 9. The lateral external surfaces 81 have a shape complementary to the lateral housing surfaces 102, 106, so as to promote thermal contact of the internal partitions 6, 8 with the peripheral partitions 10. In the embodiment of FIG. 3, the lateral housing surfaces 102, 106 of an end of internal partition 6, 8 are parallel two by two.

In reference more specifically to FIG. 4, the tightening means 9 comprises a plurality of tightening elements 90 spaced apart from each other along the height of the basket 1. Each tightening means 90 comprises a screw 92 and a nut 96 cooperating with the screw 92. The screws are housed in holes 91 of the peripheral partition 10, passing through the external surface 19. In this way, the tightening elements 90 can be screwed/unscrewed from outside the basket 1, by acting on the heads of screw 92. The nut 96 is located between two jaws 94, such that the jaws 94 are separation biased by the nut 96 and the screw 92 to press the lateral wall surfaces 81 against the lateral housing surfaces 102.

More precisely, the nut 96 has two first tilted surfaces 97 and the peripheral wall 10 comprises, at each jaw 94, two second tilted surfaces 95 with a complementary shape to the first tilted surfaces 97. The first tilted and second tilted surfaces 95, 97 are intended to be supported on each other, so as to maximise the mechanical contact area between them and promote lateral tightening of the walls 82, 84 of internal partition 6, 8 in their housing 100.

The tightening elements 90 can each exert a lateral tightening force $F_1$ the value of which is independent of that of the other tightening elements 90, as a function of the tension exerted on the screw 92 and the nut 96. The tightening elements 90 thereby make it possible to compensate all the more readily for the possible differential expansions and possible manufacturing and assembly tolerances of the internal partitions 6, 8 and/or the peripheral partitions 10.

To that end, independent tightening elements 90 spaced apart from each other along of the height of the basket 1 make it possible in particular to have a mechanical and thermal contact of the internal partition 6, 8 and the peripheral partition 10 over substantially the entire height of the basket 1, that is for example at least ¾ of the height of the peripheral partition 10.

In the embodiment of FIGS. 3 and 4, the jaws 94 are formed as a single piece, in particular by extrusion, with the peripheral partition 10. The internal partition walls 82, 84 are thus in thermal contact with the peripheral wall 10, at least at both lateral opposite surfaces 102, 106 of the housing. The walls 82, 84 are thereby pinched in their housing 100. The first lateral surface 102 of the housing 100 then forms a first pinching surface of each wall 82, 84 and the second lateral surface 106 of the housing 100 forms a second pinching surface of this wall 82, 84.

The internal partition 6, 8 and the tightening elements 90 are substantially symmetrical by a planar symmetry of a plane parallel to the walls 82, 84 and passing through the axis 93.

In addition, the first tilted surfaces 97 are tilted to the external surface 19. The walls 82, 84 are thus each in contact with the bottom 104 of their respective housing 100. The tightening elements 90 of the embodiment of FIGS. 3 and 4 are the only means for attaching the internal partition 6, 8 to the peripheral partition 10.

Alternatively, each jaw 94 could be formed as a single piece with one of the walls 82, 84 or attached to one of the walls 82, 84, so as to project from the rest of the wall lateral internal surface 85. These alternative embodiments have possibly the advantage of allowing a more ready machining of the jaws 94.

On the other hand, the internal partition 6, 8 attached to the peripheral wall 10 and/or the tightening elements 90 could also have no planar symmetry.

Further alternatively, the first tilted surfaces 97 could of course be of opposite tilts, that is move closer to each other towards the internal surface 17.

By way of alternative, there could be a clearance between the edge of each of the walls 82, 84 and the housing bottom 104, enabling in particular possible differential expansions of the basket 1 and/or possible impacts undergone by the basket 1 along the direction 93 to be compensated for. However, the only thermal contact of the lateral external surfaces 81 with the housing surfaces 102 and possibly the thermal contact of the lateral internal surfaces 85 with the lateral surfaces 106 of the housing is generally sufficient to allow satisfactory thermal exchanges of the internal partitions 6, 8 with the peripheral partitions 10. To that end, it is generally sufficient that the value ratio of the thickness 107 of each of the walls 82, 84 to the length of the surface 105 of contact of its lateral external surface 81 with one of the lateral housing surfaces 102, 106, in the transverse cross-sectional plane of the basket 1 represented in FIG. 3 or in FIG. 8 and for example the transverse plane P of FIG. 2, is between 0.2 and 1.

By way of further alternative, the basket 1 can comprise means for attaching (not represented) the internal partitions 6, 8 to the peripheral partitions 10, wherein the tightening means 9 is only used to press the wall(s) 80, 82, 84 against at least one of the lateral housing surfaces 102, 106, once the internal partition 6, 8 is at least partially attached to the peripheral partition 10.

Figure 5:
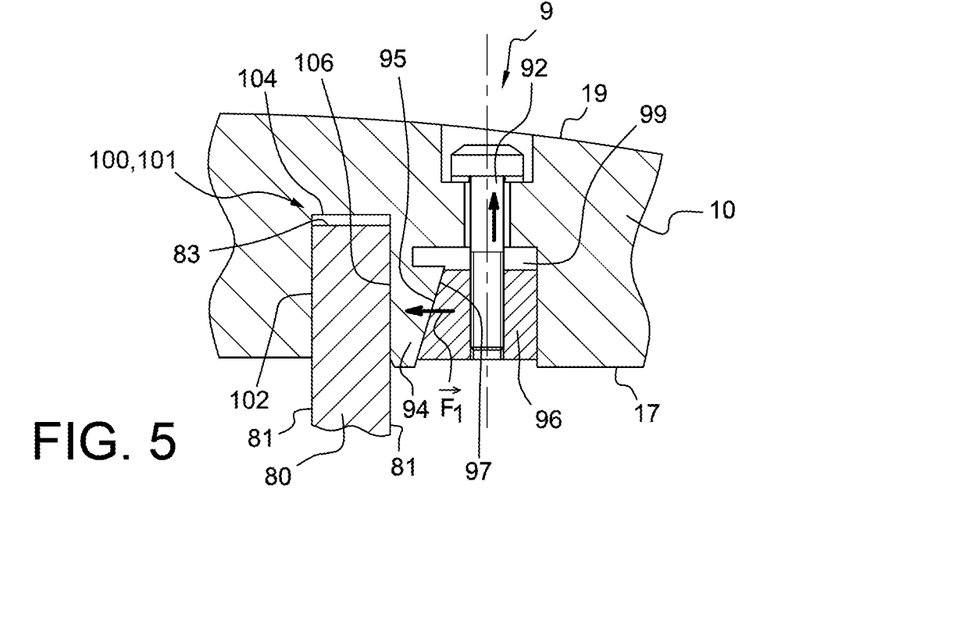
FIG. 5 is a partial schematic representation of an alternative embodiment of FIG. 3, showing tightening of an internal partition in a peripheral partition housing.

FIG. 5 represents an alternative embodiment of FIGS. 3 and 4, wherein the internal partition 6, 8 comprises a single wall 80. This single wall 80 comprises two opposite lateral external surfaces 81 and an edge 83 bringing together both these lateral surfaces. The recess 101 housing the end of the internal partition 6, 8 comprises a single housing 100 housing the end of the single wall 80. The edge 83 is located remote from the bottom 104 of the housing 100.

The lateral external surfaces 81 of the internal partition 6, 8 are pressed against the lateral housing surfaces 102, 106 by a tightening element 9 comprising a single jaw 94. The jaw 94 is for example formed as a single piece by extrusion with the peripheral partition 10. This jaw 94 is tightened sideways against the wall 80 by a screw 92 cooperating with a nut 96 accommodated in a nut housing 99. The nut housing 99 leads to the internal surface 17, so as to be locally orthogonal to the internal surface 17.

Figure 6:
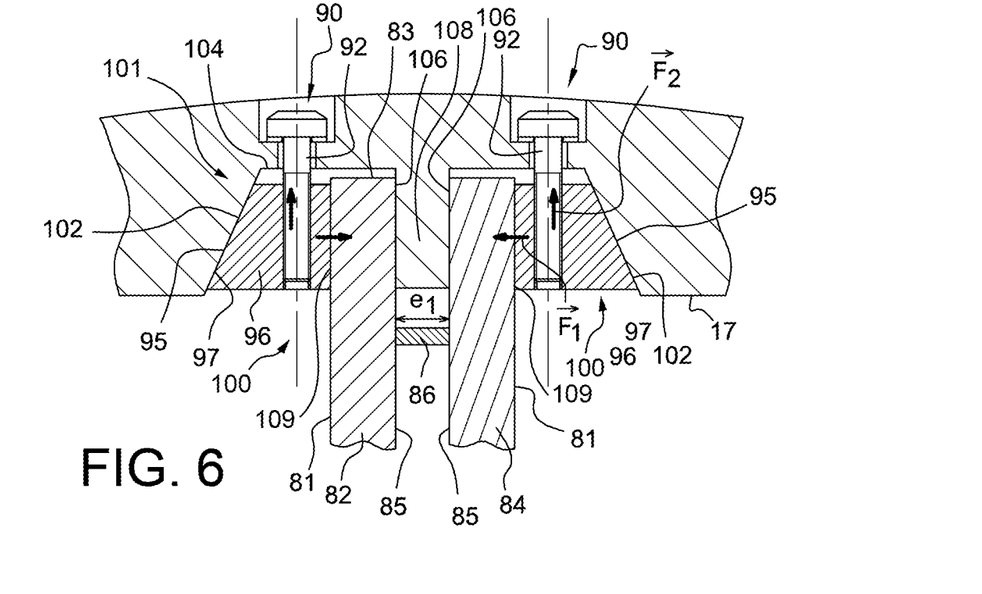
FIG. 6 is a partial schematic representation of another alternative embodiment of FIG. 3, showing tightening of an internal partition in a peripheral partition housing.

The alternative embodiment of FIG. 6 is distinguished from that of FIGS. 3 and 4 in that it comprises two tightening elements 90 in a transverse cross-sectional plane of the basket 1. On the other hand, the tightening elements 90 are accommodated at least partially in the housings 100, and the tightening elements 90 are free of jaws 94. The recess 101 accommodating the end of the internal partition 6, 8 comprises two housings 100 separated from each other by an intermediate wall 108 of the peripheral partition 10. Each of the walls 82, 84 is pinched between a first pinching surface formed by a lateral housing wall 106 and a second pinching surface 109 formed by the surface of contact of the nut 96 with the wall 82, 84 it tightens.

The tightening elements 90 each comprise a screw 92 and a nut cooperating with the screw 92. The screw holes 91 lead to the housings 100 at the housing bottoms 104. The nuts 96 are located in the housings 100, by being supported by the external surface 81 of the wall 82, 84 along the second pinching surface 109. The nuts 96 carry the first tilted surfaces 97 and the second tilted surfaces 95 form the first lateral housing surfaces 102. The second tilted surfaces 95 are directly cut in the peripheral partition 10, so as to lead to the internal surface 17 forming an angle different from 90° with the internal surface 17.

In a similar way to the embodiment of FIGS. 3 and 4, the screws 92 are tightened with a tightening force $F_2$ oriented in the longitudinal direction of the internal partition 6, 8, that is in the first direction 13 or the second direction 15. The nuts 96 then exert directly a lateral tightening force $F_1$ on the lateral external surfaces 81 of the wall 82, 84, so as to press the lateral internal surfaces 85 of the wall 82, 84 against the second lateral housing surfaces 106.

The spacing $e_1$ between the walls 82, 84 of the internal partitions is held constant by a transverse air gap 86 supported on the lateral internal surfaces 85 of the wall 82, 84 and by the portion of peripheral partition 10 located between the two contiguous housings 100.

Figure 7:
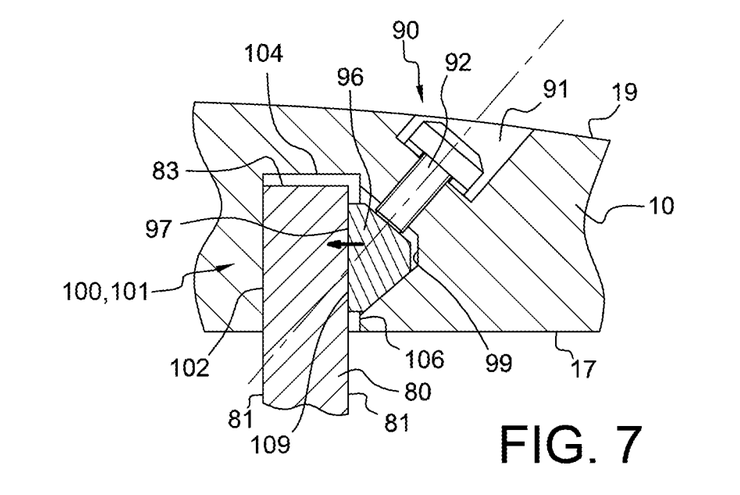
FIG. 7 is a partial schematic representation of an alternative embodiment of FIG. 5, showing tightening of an internal partition in a peripheral partition housing.

The alternative embodiment of FIG. 7 differs from the embodiment of FIG. 5 in that the tightening element 90 is at least partially in the housing 100, and in that the tightening element 90 comprises neither nut nor jaws. The recess 101 comprises a single housing 100 which houses partially the pusher 96, the wall 80 being pinched between a first pinching surface formed by the first lateral housing surface 102 and a second pinching surface 109 which is the surface of contact of the pusher 96 with the wall 80.

The wall 80 comprises two opposite lateral external surfaces 81 gathered by an edge 83. The tightening element 90 comprises a screw 92 the head of which is accessible from outside the basket 1, and a pusher 96 intended to press one of the lateral external surfaces 81 against the first lateral housing surface 102. Because of the pusher 96, the other lateral external surface 81 of the wall is not in mechanical and thermal contact with the second lateral housing surface 106. The screw 92 is supported on the pusher 96 which is located at least partially in an indentation 99 of the peripheral partition 10, leading into the housing 100. The wall edge 83 is located remote from the housing bottom 104.

Figure 8:
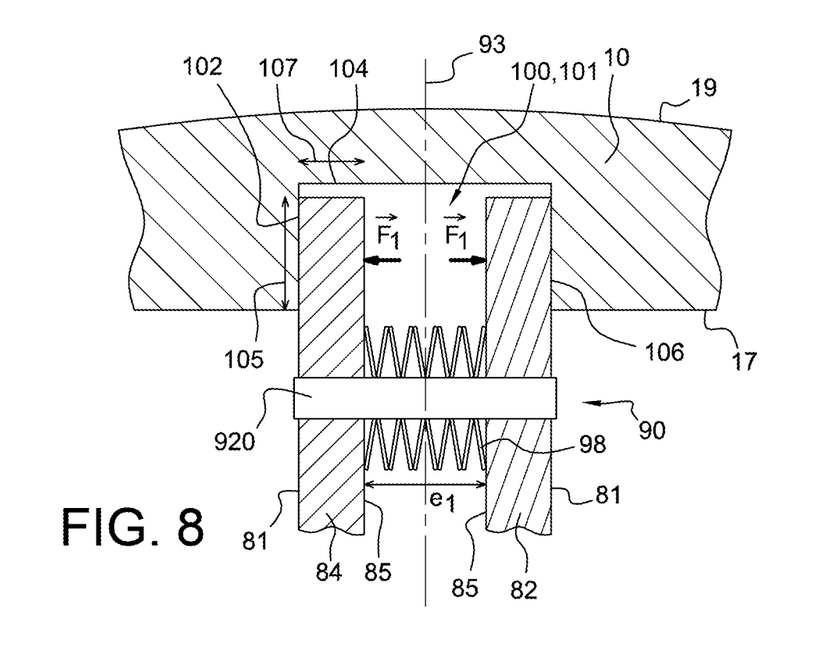
FIG. 8 is a partial schematic representation of another further alternative embodiment of FIG. 3, showing tightening of an internal wall in a peripheral partition housing.

FIG. 8 represents another alternative of the invention which is discriminated from the embodiment of FIGS. 3 and 4 in that the tightening elements 90 do not include a screw, a nut or a jaw. On the other hand, the tightening elements 90 are located remote from the peripheral partition 10. Finally, both walls 82, 84 of the internal partition 6, 8 are accommodated in a single housing 100. This single housing 100 forms the recess 101, both lateral external surfaces 81 of the walls 82, 84 being respectively pressed against the first lateral housing surface 102 and the second lateral housing surface 106.

The end of the internal wall 6, 8 and the tightening element 90 are symmetric by planar symmetry passing through the axis 93. The tightening element 90 represented in this figure comprises an elastic tightening element 98 and a stress element 920 of the elastic tightening element 98, the stress element 920 also enabling the tightening element 98 to be held between the lateral internal surfaces 85.

The elastic tightening element 98 takes for example the shape of a set of spring steel bent elastic washers. The set of washers is located in the spacing $e_1$ and is supported by the lateral internal surfaces 81 it separation biases the one from each other. The lateral external surfaces 81 of the wall 82, 84 are thereby pressed against the lateral housing surfaces 102, 106, with a lateral force $F_1$.

The stress element 920 is intended to compress the elastic tightening element 98, so as to enable it to be inserted between the lateral internal surfaces 81 of the wall. On the other hand, the stress element 920 can also be used to bias the elastic tightening element 98 in separation, such that the elastic tightening element 98 moves the lateral internal surfaces 85 sufficiently away from each other to press the lateral external surfaces 81 against the lateral housing surfaces 102, 106.

The basket 1 is assembled according to the method described below. The internal partitions 6, 8 are attached to each other beforehand so as to form the centre cells 2 of the basket. In the following, the peripheral partitions 10 are assembled to the internal partitions 6, 8, so as to close the peripheral cells 2 of the basket 1 sideways. The ends of the internal partitions 6, 8 are each housed in their respective recess 101, by pressing at least one of the lateral wall surfaces 81, 85 of the internal partition against at least one of the housing surfaces 102, 106 of the recess.

A bottom and a head plate 3 contribute in holding all of the partitions of the basket 1, on either side of the height 11 of the basket, the head plate also enabling the basket to be handled.

The method of assembling the internal partition 6, 8 with the peripheral partition 10 is now described in more detail in reference to FIGS. 3 to 8.

Both opposite ends of the walls 80, 82, 84 of the internal partitions 6, 8 are first accommodated in their respective housings 100. The tightening means 9 located at one of the ends then presses at least one of the lateral surfaces 81, 85 of the wall 80, 82, 84 against at least one of the lateral housing surfaces 102, 106. The wall 80, 82, 84 is thereby located between this lateral housing surface 102, 106 and the tightening means 9.

When the internal partition 6, 8 comprises two walls 82, 84, both these walls 82, 84 are first preferably accommodated both in their housing 100, before the tightening means 9 presses them against at least one of the lateral housing surfaces 102, 106.

In addition, the internal partitions 6, 8 can be at least partially attached to the peripheral partitions 10, before the tightening means 9 ensures pressing of at least one of the lateral surfaces 81, 85 of at least one wall 80, 82, 84 against the corresponding lateral housing surface 102, 106.

The walls 80, 82, 84 can possibly slide along the elongation direction of the internal partitions 6, 8, that is along the first direction 13 or along the second direction 15, before they are tightened against at least one of the lateral housing surfaces 102, 106 by the tightening means 9. This sliding enables for example possible differential expansions of the basket 1 to be compensated for and/or impacts undergone by the basket 1 to be accommodated.

Of course, various modifications can be made by those skilled in the art to the invention just described without departing from the scope of the disclosure of the invention.

What is claimed is:

1. A basket for transport and/or storage packaging of radioactive materials, the basket comprising:
    at least one internal partition comprising at least one wall having two opposite lateral surfaces, and
    at least one peripheral partition,
    the internal partition delimits at least partially on either side of the same two cells intended to house the radioactive materials, the peripheral partition participating with the internal partition in delimiting the cells,
    the peripheral partition comprising at least one housing accommodating one end of the at least one wall, the housing comprising two opposite lateral housing surfaces and a bottom bringing together the two lateral housing surfaces,
    wherein the basket comprises a fastener configured to press at least one of the lateral wall surfaces against at least one of the lateral housing surfaces and to tighten the lateral wall surface against the lateral housing surface.

2. The basket according to claim 1, wherein the internal partition comprises two parallel walls separated by a spacing, each of the walls having a lateral external surface and a lateral internal surface,
    wherein at least one of the lateral external surfaces is configured to be pressed against one of the lateral housing surfaces by the fastener, or
    wherein at least one of the lateral internal surfaces is configured to be pressed against one of the lateral housing surfaces by the fastener.

3. The basket according to claim 1, wherein the fastener generates a pinching strain of the wall end of the internal partition between:
    said lateral housing surface against which the wall is pressed, called a first pinching surface, and
    a second pinching surface facing the first pinching surface.

4. The basket according to claim 3, wherein the end of the at least one wall is pinched in the housing, by being in mechanical contact with both lateral housing surfaces.

5. The basket according to claim 1, wherein the peripheral partition comprises an internal surface oriented inwardly of the basket and participating in delimiting the cells,
    wherein the housing opens to the internal surface, such that at least one of the lateral housing surfaces is orthogonal to the internal surface.

6. The basket according to claim 1, wherein a value ratio of a thickness of at least one wall to a surface length of wall lateral surface contact with one of the lateral housing surfaces, in a transverse cross-sectional plane of the basket, is between 0.2 and 1.

7. The basket according to claim 1, wherein the internal partition is in mechanical contact with the peripheral partition on at least ¾ the height of the peripheral partition.

8. The basket according to claim 7, wherein the internal partition is in mechanical contact with the peripheral partition over substantially the entire height of the basket.

9. The basket according to claim 1, comprising a plurality of internal partitions formed by stacked interlaced structural sets.

10. The basket according to claim 1, wherein the fastener comprises a plurality of tightening elements spaced from each other along the height of the basket.

11. The basket according to claim 10, wherein each fastener is configured to exert a tightening force the value of which is independent of that of the other tightening elements.

12. The basket according to claim 1, wherein the fastener is configured to be tightened/untightened from outside the basket.

13. The basket according to claim 1, wherein the fastener comprises a screw and a nut configured to cooperate with the screw.

14. The basket according to claim 13, wherein the fastener comprises at least one jaw, wherein the jaw is separation biased by the nut to press at least one of the lateral wall surfaces against at least one of the lateral housing surfaces.

15. The basket according to claim 1, wherein the fastener comprises at least one first tilted surface, the peripheral partition or the wall end comprising at least one second tilted surface complementary to the first tilted surface and configured to be supported on the first tilted surface.

16. The basket according to claim 2, wherein the fastener comprises at least one elastic tightening element located in the spacing, the elastic tightening element tending to press at least one of the lateral external surfaces against one of the lateral housing surfaces.

17. A transport and/or storage pack for radioactive materials, comprising a packaging and a lid closing the packaging, the packaging housing a basket according to claim 1.

18. The transport and/or storage pack according to claim 17, wherein the radioactive material comprises nuclear fuel assemblies.

19. A method for assembling a basket the basket, the basket comprising:
- at least one internal partition comprising at least one wall having two opposite lateral surfaces, and
- at least one peripheral partition,
- the internal partition delimits at least partially on either side of the same two cells intended to house the radioactive materials, the peripheral partition participating with the internal partition in delimiting the cells,
- the peripheral partition comprising at least one housing accommodating one end of the at least one wall, the housing comprising two opposite lateral housing surfaces and a bottom bringing together the two lateral housing surfaces,
- wherein the basket comprises a fastener configured to press at least one of the lateral wall surfaces against at least one of the lateral housing surfaces and to tighten the lateral wall surface against the lateral housing surface,
- the method comprising, after a step of accommodating the end of the wall in the housing, a step of pressing at least one of the lateral wall surfaces against at least one of the lateral housing surfaces, such that the wall is located between the fastener and the lateral housing surface against which the lateral wall surface is pressed.

20. The basket according to claim 1, wherein the fastener does not contact the at least one internal partition.

* * * * *